F. G. BOSWELL.
STAMP AND CHECK CANCELING AND POSTMARKING MACHINE.
APPLICATION FILED OCT. 22, 1917.
1,274,847.
Patented Aug. 6, 1918.
6 SHEETS—SHEET 1.
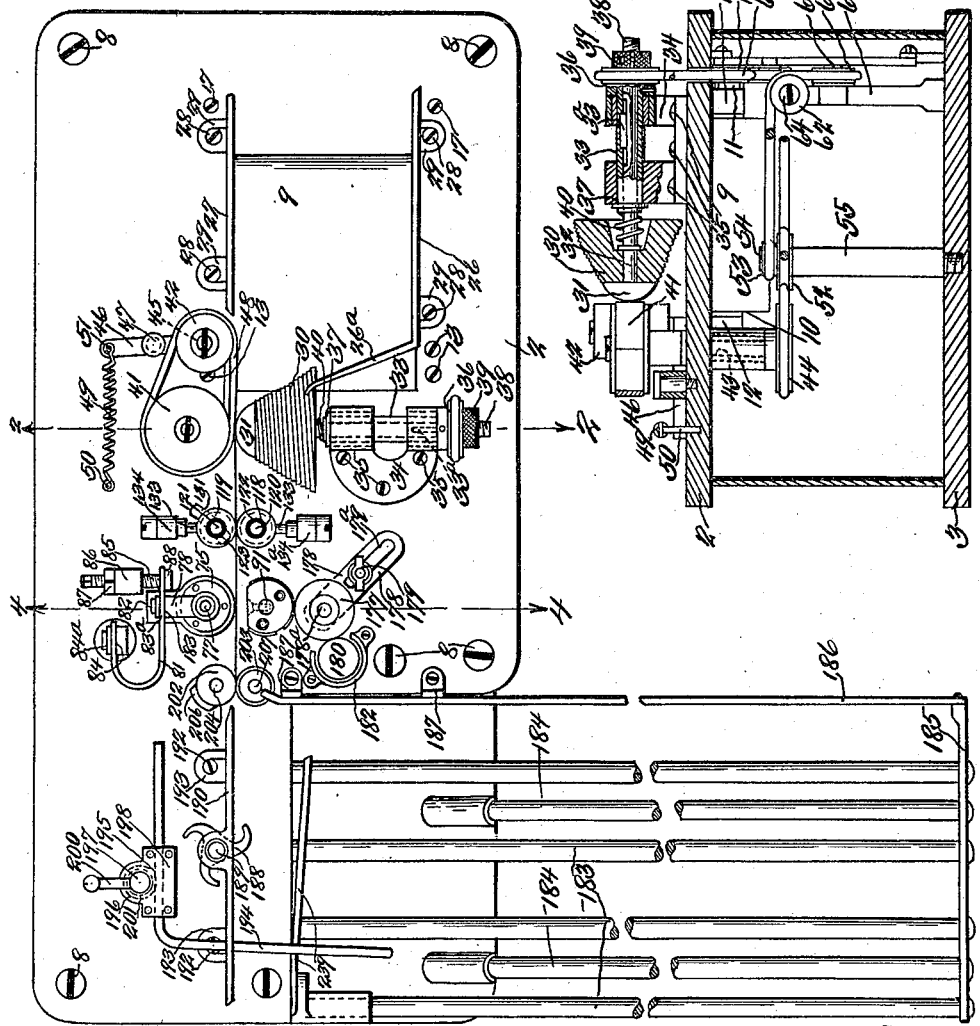
Witnesses
T. P. Britt
Philip A. Jerrell
Inventor
Francis G. Boswell,
By
Attorney

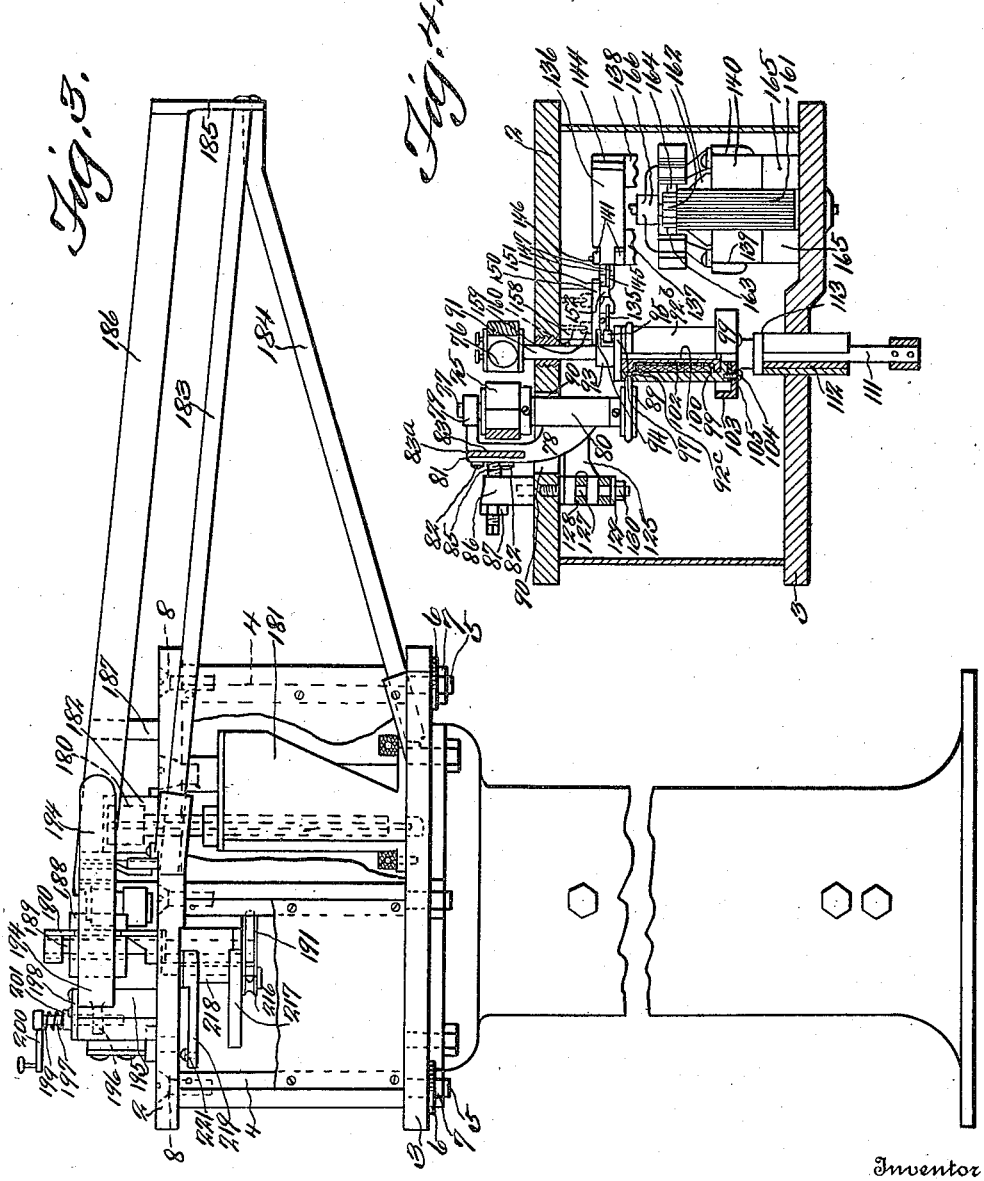

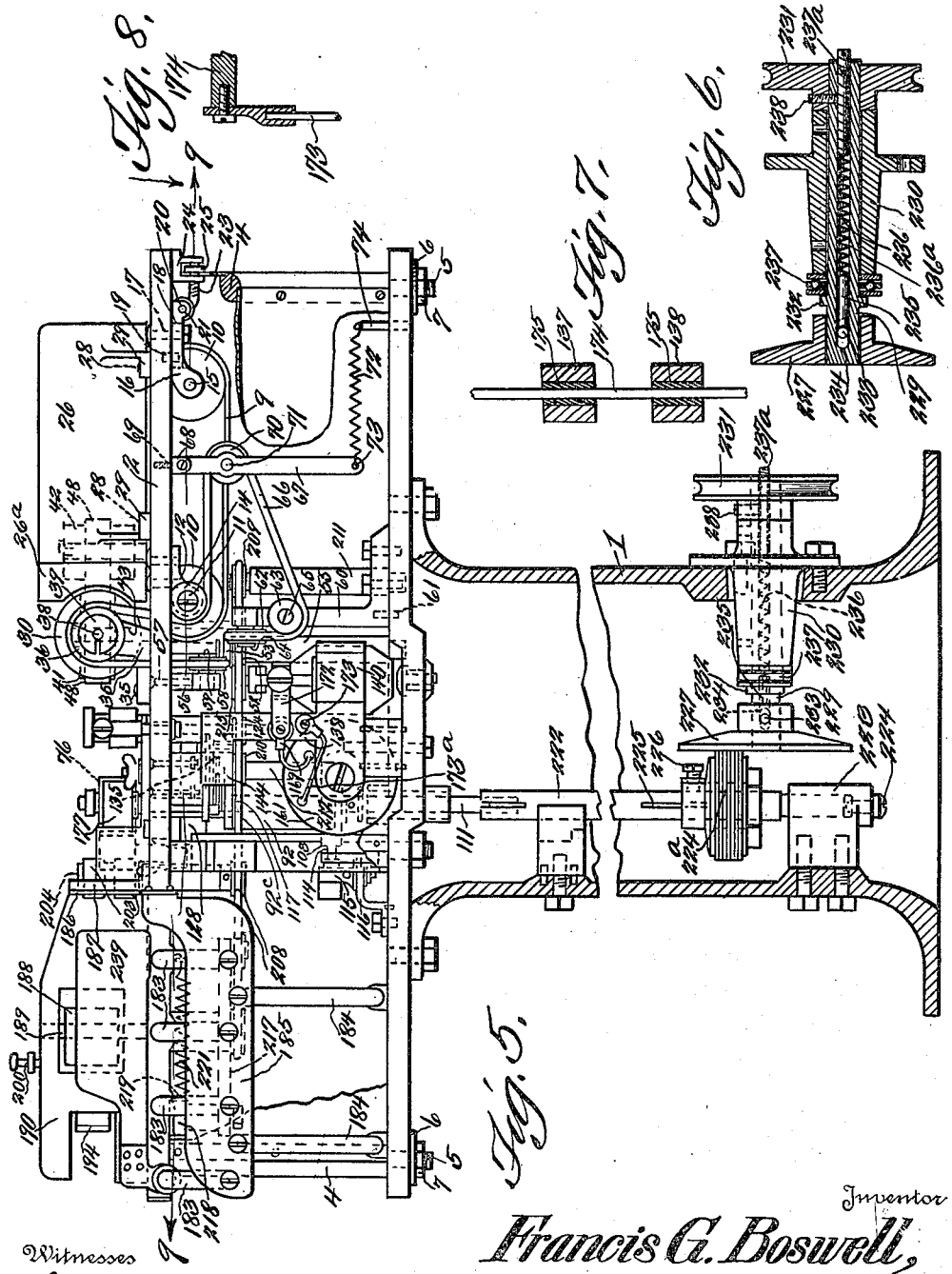

F. G. BOSWELL.
STAMP AND CHECK CANCELING AND POSTMARKING MACHINE.
APPLICATION FILED OCT. 22, 1917.

1,274,847.

Patented Aug. 6, 1918.
6 SHEETS—SHEET 4.

Witnesses

Inventor
Francis G. Boswell,
By
Attorneys

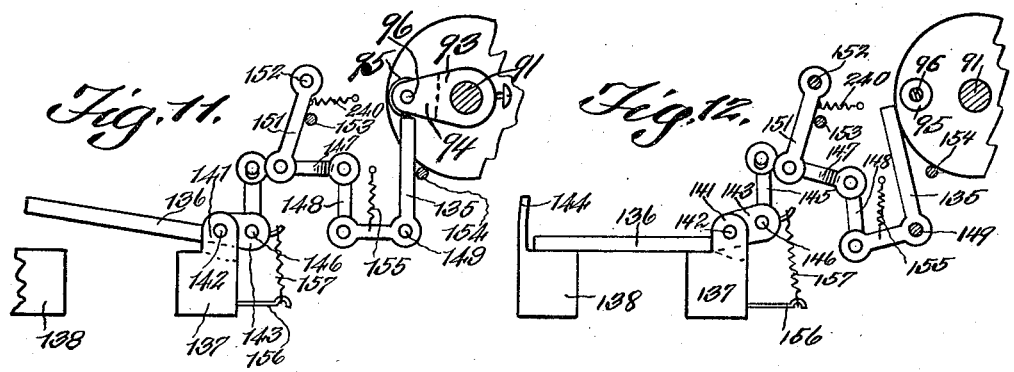
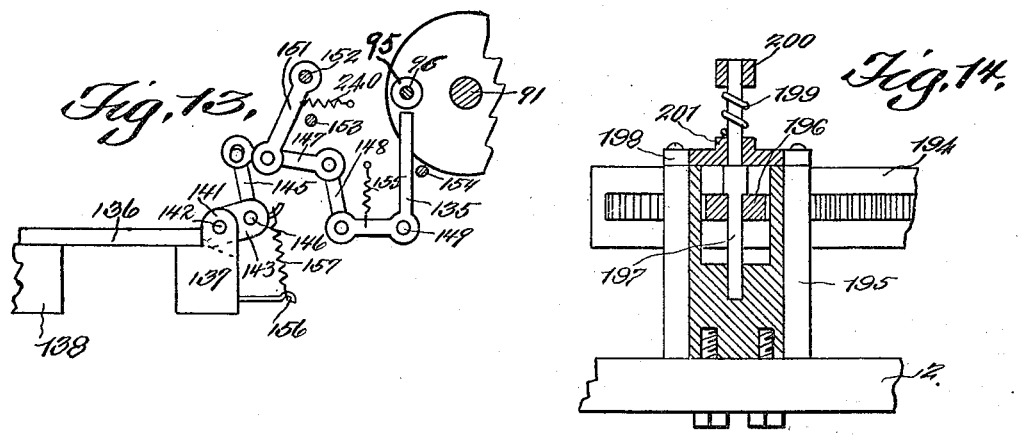
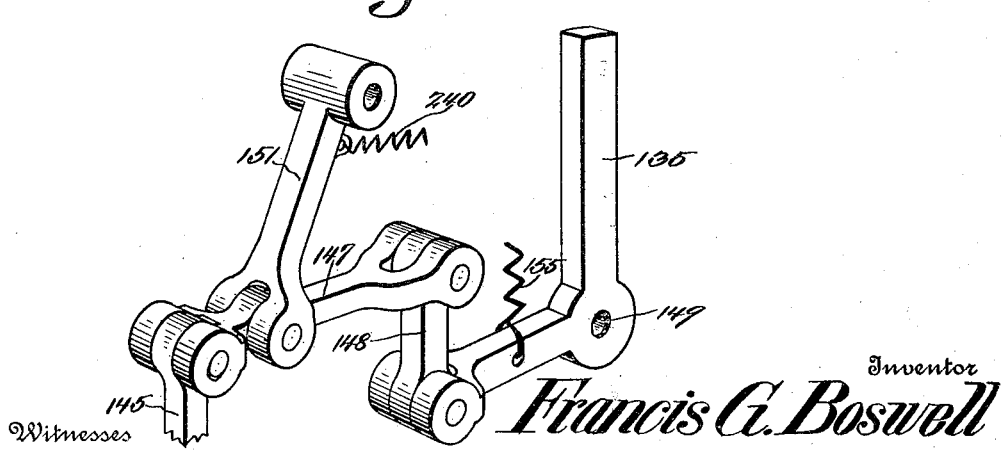

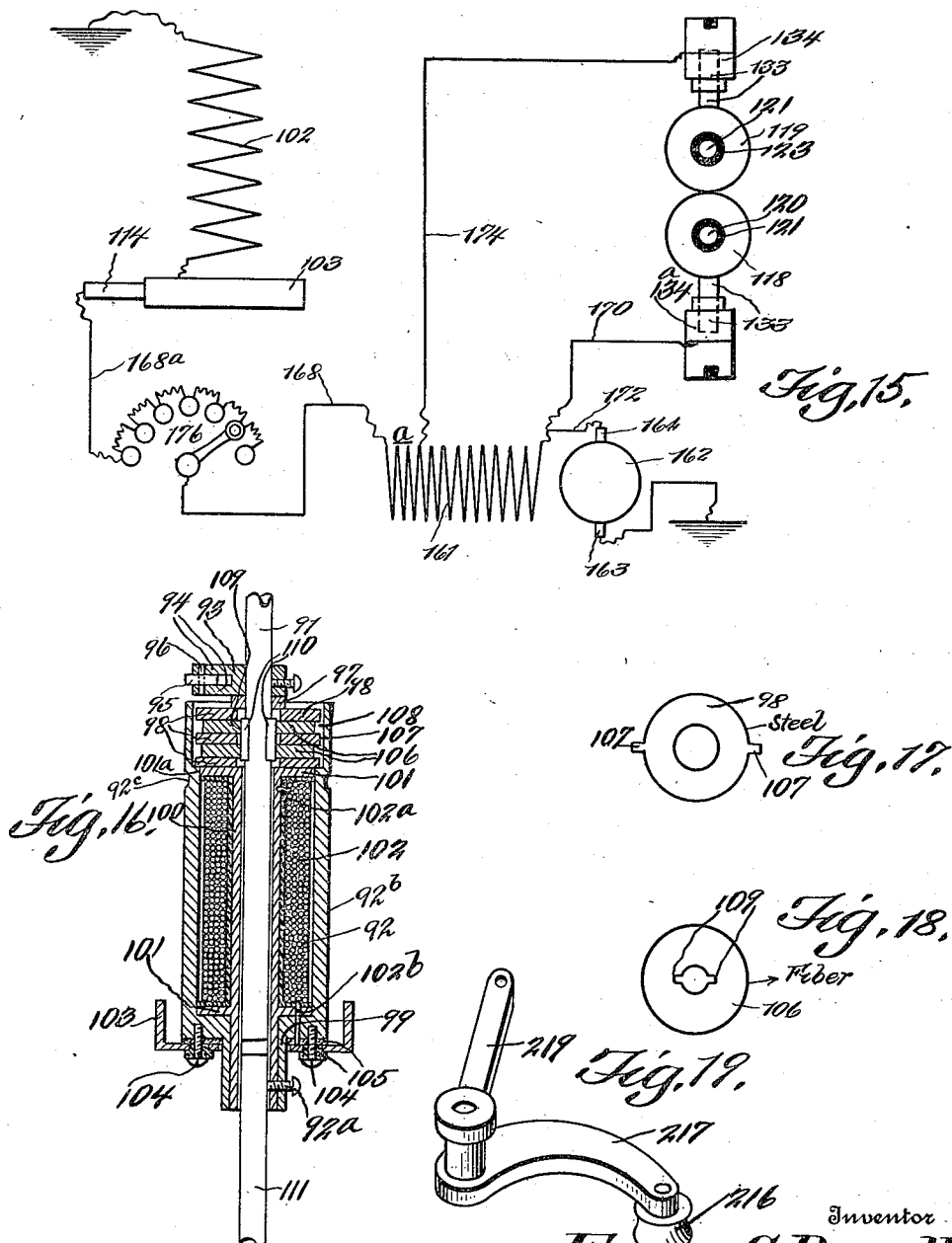

UNITED STATES PATENT OFFICE.

FRANCIS G. BOSWELL, OF WASHINGTON, DISTRICT OF COLUMBIA, ASSIGNOR TO ROBERT A. BOSWELL, OF WASHINGTON, DISTRICT OF COLUMBIA.

STAMP AND CHECK CANCELING AND POSTMARKING MACHINE.

1,274,847.  Specification of Letters Patent.  Patented Aug. 6, 1918.

Application filed October 22, 1917. Serial No. 197,896.

*To all whom it may concern:*

Be it known that I, FRANCIS G. BOSWELL, a citizen of the United States of America, residing at Washington city, District of Columbia, have invented a new and useful Stamp and Check Canceling and Postmarking Machine, of which the following is specification.

This invention belongs to that class of printing machinery that is designed for the purpose of canceling stamps and imprinting the postmarks on letters.

Machines of this kind are of two classes, namely: the intermittent die class and the rotary cylinder class, and the present invention belongs to the former class.

Heretofore, the general run of stamp and check canceling machinery has embodied structure in which the letter or check is either stopped in its transit through the machine (as in the rotary cylinder machine) or else impinges on a mechanism that liberates the die (as in intermittent die machine). These devices for stopping the letter or tripping the die are in the letter path and, if not properly adjusted become a hazard because of their liability to mutilate letters, post-cards and checks by nicking or tearing the edges.

One of the objects of this invention is to remove the danger of mutilation of the mail by providing for letters or cards an uninterrupted path through the machine, there being no device against which the letter is required to strike in its passage. The operation of the die is effected by the breaking of an electrical short-circuit, as the letter passes between two auxiliary feed rolls adjacent to the printing couple.

A machine operating its printing die intermittently must necessarily have an operating member for the die that will effectively start the die from a state of rest, keep it in motion, and readily stop it.

A further object of the invention therefor is to provide a clutch for moving the die and an attendant energizing means therefor, that will give the clutch an extraordinary pulling effort at the moment of starting the die, and overcoming its inertia, that will diminish this pulling effort after the die has been started, and that will reduce the pulling effort to a minimum, when the die is held against rotation.

Practice has shown that very thick mail, which it is frequently necessary to cancel by a postmarking machine, does not readily acquire the speed of the machine. This is due to the slipping of the advancing rolls on the surface of the piece of mail and results in the printing member, when the said piece of mail has reached the printing couple, having advanced too far to properly position the cancellation and postmark. Means for causing the printing member to lag in speed behind the speed of the machine will meet and overcome the objection and it is a further object of the invention to provide a readily adjustable manually operable means for this purpose.

A further object is to provide a clutch for the die, that will automatically adjust itself to compensate for wear between its driving and driven elements.

A further object is to increase the output of this class of machinery by providing a mechanism that can be operated at very high speeds without impairment to its vital parts.

A further object of the invention is to provide a clutch mechanism for use with an intermittently operated die that will contain means for holding lubricant in contact with the parts that are exposed to much friction.

A further object of the invention is to improve, simplify, and render more practical the postmarking, stamp and check canceling machine set forth, illustrated and claimed in the Patents Numbers 1,024,552 and 1,058,696 issued April 30, 1912, and April 8, 1913, respectively to Francis G. Boswell and assigned to Robert A. Boswell, and Patent No. 1,243,802 issued October 23, 1917, to Robert A. Boswell.

The structure disclosed herein may require certain changes to adapt it to the needs of practice and the right is, therefore, claimed to make any changes that do not depart from the spirit of the subjoined claims.

The same numerals of reference designate the same parts throughout the drawings, wherein:

Figure 1 is a plan view of the improved post-marking, stamp and check canceling machine constructed in accordance with the invention.

Fig. 2 is a sectional view on line 2—2 of Fig. 1.

Fig. 3 is an end elevation of the post-marking and canceling machine.

Fig. 4 is a sectional view on line 4—4 of Fig. 1.

Fig. 5 is a view in side elevation of the canceling machine, showing the supporting column in section, illustrating driving parts for the machine in elevation.

Fig. 6 is a sectional view through a portion of the friction driving means in the base of the supporting column.

Fig. 7 is a detail sectional view of the parts 137, 138, 174, and 175.

Fig. 8 is a detail sectional view of the part 173, showing its connection with the rod 174.

Fig. 10 is a perspective view of the links and levers 135, 145, 147, 148, 149, 151 and 155.

Fig. 11 is a diagrammatic plan view of the mechanism for retarding and releasing the member 93 and the shaft 91.

Fig. 12 is a view similar to Fig. 11 showing the member 93 and the shaft 91 as having been released.

Fig. 13 is a view similar to Figs. 11 and 12, showing the parts of said retarding and releasing means in different positions to those shown in Figs. 11 and 12.

Fig. 14 is a sectional view of the holder and its attendant parts for the packer extension arm.

Fig. 15 is a diagrammatic view of the electric means for operating the die cylinder.

Fig. 16 is a sectional view of the clutch mechanism for the die cylinder.

Fig. 17 is a detail view of one of the washers 98.

Fig. 18 is a detail view of one of the members 106.

Fig. 19 is an enlarged detail view of the belt tightening lever having the arms 217 and 219.

Figure 9:
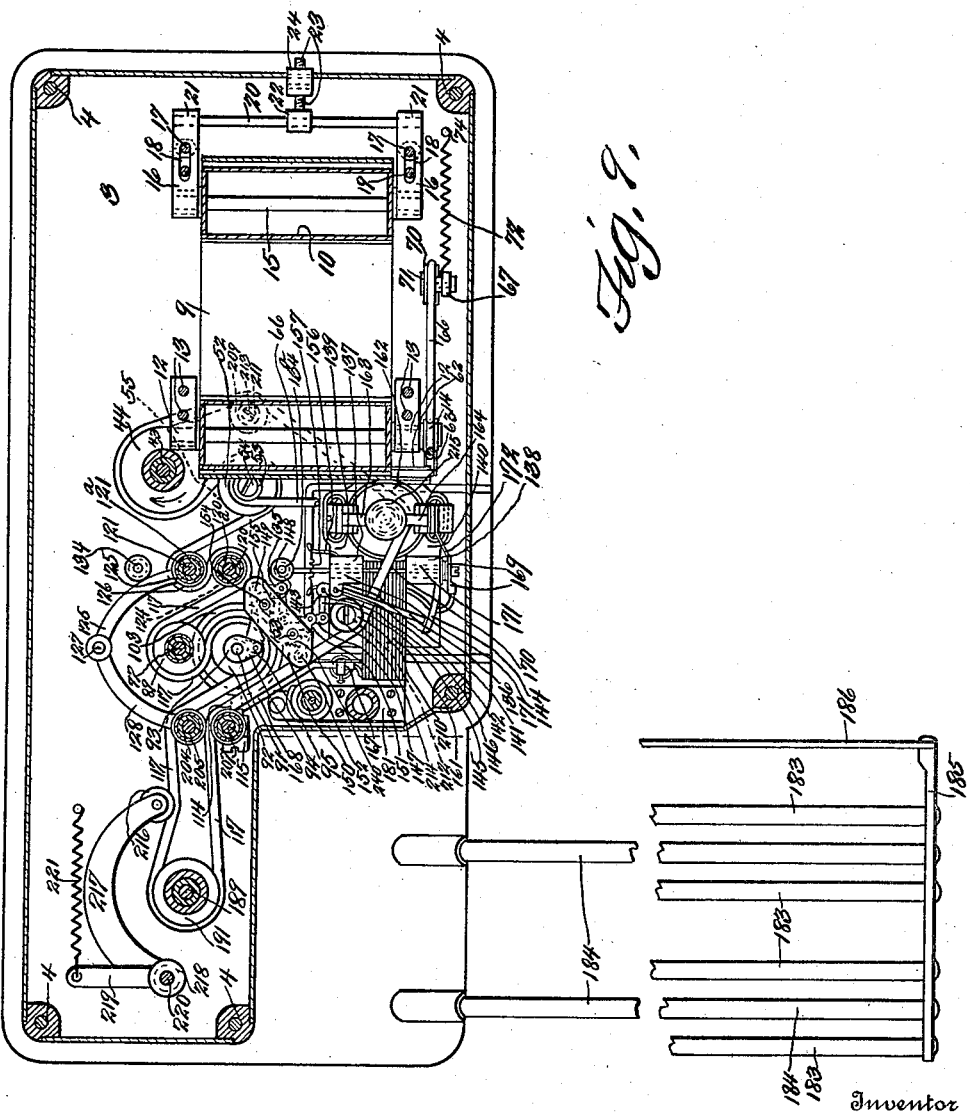
Fig. 9 is a sectional view on line 9—9 of Fig. 5.

The machine herein shown may be best described by considering separately its three component parts; the feed and separating portion where individual letters are separated from a pack and fed forward; the printing portion where the post-mark and cancellation are imprinted upon them; and the packing portion where the letters are packed in orderly fashion after having undergone the cancellating operation.

The column 1 supports the machine while the upper bed-plate 2 carries the mail handling parts whose concomitant operating mechanism is contained in the space between the bed-plate 2 and the lower bed-plate 3, the spacing columns 4 connecting the two bed-plates so as to provide such space. The columns 4 are made with appropriate threaded studs 5 at one end by means of which they are fastened to the bed-plate 3 by appropriate washers 6 and nuts 7. The upper bed-plate 2 is secured to these columns 4 by flat-head screws 8 which penetrate countersunk holes formed in it and screw into the columns.

The feed-belt 9 is carried by appropriate drums 10; the forward drum is rigidly mounted on a shaft 11 which turns in bearings 12 securely attached to the underside of the bed-plate 2 by the flat-head screws 13. The sheave-pulley 14 is attached to the end of the shaft 11 just outside of one of the bearings 12 and this pulley provides the means for driving the feed-belt. The rear drum 10 is similar to the forward drum, but its shaft 15 is supported in movable bearings 16 held to the bed-plate 2 by the bolts 17 which pass through elongated slots 18 in the bearings. Dowel pins 19 attached to the bed-plate 2 also enter the elongated slots and serve with the bolts 17 to keep the bearings 16 in alinement. Connecting the two bearings 16 is a rod 20 in pivotal engagement with the eyes 21 of said bearings, said rod having a shouldered portion 22 at its center from which emanates the threaded stud 23. A bifurcated plate 24 attached in any suitable manner to the bed-plate 2 has eyes through which the stud 23 passes. A knurled nut 25 engages this stud between the forks of the plate 24. When the bolts 17 are loose, the rod 20 and the plate 24 with their attendant parts serve as the means for regulating the tension of the feed-belt 9. The drums 10 are of such diameters and so mounted that they will bring the upper side of the feed-belt 9 just above the upper surface of the bed-plate 2. This arrangement removes the danger of the lower edges of letters impinging on the bed-plate as they leave the feed-belt preparatory to their passage through the various pairs of rolls.

To form a hopper for appropriately handling stacks of letters on the feed-belt are the fences 26 and 27 which are held on the bed-plate 2 adjacent to the longitudinal edges of the feed-belt by screws 28 that pass through the feet 29.

The separator cone 30 stands near the fence 26 and its axis of rotation is parallel to that of the feed-belt, but its direction of rotation is opposite. It is provided with narrow flat surfaces arranged around its body in the form of a helix and, at its smaller end, it is capped with a globular-shaped rubber piece 31 that may be attached in any satisfactory manner. Held frictionally on a shaft 32, the cone 30 derives its motion from a sleeve 33 by means of a splined connection 33ª. The sleeve 33 rotates in bearings formed in the bracket 34 which is attached to the bed-plate 2 by the screw 35. A sheave 36 is attached to the sleeve close to one of its bearings and this sheave together with the shoulder 37 prevents longitudinal movement of the sleeve in its bearings, but, at the same time, allows it to be rotated by the power transmitted to the sheave 36. The shaft 32 extends through the sleeve 33 a sufficient distance for its threaded end 38 to be engaged by the knurled nut 39. The nut 39 is designed to fit 38 snugly enough to prevent vibration from changing its position, but not so snugly as to preclude its manipulation by hand. A spring, 40 compressed between the recessed portion of the cone 30 and the shoulder 37, serves to force the cone toward the feed-roll 41 until the nut 39 bears against the sheave 36, the shaft 32 being slidable in the sleeve 33. It will be seen that the nut 39 serves as a means for adjusting the separator cone toward the feed-roll to compensate for wear on the rubber end piece 31, while the spring 40 provides a resilient means to permit the cone to yield for the passage of letters of varying thicknesses.

In addition to the feed-belt before referred to, the feeding means further comprises the feed-roll 41 and the supplementary feed-roll 42. Roll 41 is fixed to a shaft 43 that rotates in a bearing formed in the bed-plate 2, and the shaft 43 carries at its lower end a sheave 44 as the instrument for its rotation. Roll 42 is designed to rotate on a stud 45 fixed in a lever 46 that is pivotally connected to the bed-plate 2 by the screw stud 47. In recessed portions of the rolls 41 and 42 the feed-band 48 is carried and it is held taut against the tension of the spring 49 distended between a pin 50 on the bed-plate 2 and a pin 51 on the end of the lever 46.

The means for driving the separator cone and the feed-belt is supplementary to the means for driving the rest of the rotating parts for the reason that these two parts run at a substantially reduced speed as compared with the other parts. Motion for this supplementary drive is derived from the sheave 52 of which the sheave 53 is a part. Both of these sheaves rotate on the headed screw-stud 54 that attaches to the column 55 fixed in the lower bed-plate 3. On the under surface of the bed-plate 2 there is attached the small column 56, the screw 57 being used for this purpose. This column 56 carries a sheave 58 which rotates on the headed screw-stud 59. A column 60 with a dowel 61 that penetrates the bed-plate 3 and two cap-screws which attach it thereto carries two sheaves 62 and 63 and their attendant screw-studs 64 and 65. These last two sheaves have their axes of rotation at right angles and this function, as well as the function of sheave 58, is to direct the supplementary drive belt 66 from the sheave 53 to the sheaves 14 and 36. As a means for keeping the belt 66 always tight enough to secure the necessary driving power, a belt tightener is provided. This belt tightener is composed of a lever 67 in pivotal engagement with the bifurcation of a lug 68 held on the under surface of the bed-plate 2, with a screw stud 69; an idle sheave 70 that rotates on a headed screw-stud 71; and a spring 72 attached between the pin 73 on lever 67 and stud 74 on the lower bed-plate 3. The belt 66 runs from the sheave 53 to sheave 58, thence over the sheave 36, thence around sheave 14, thence over the sheave 70, thence around the sheaves 63 and 62 in the order named and thence back to sheave 53.

The direction of rotation transmitted to the sheave 52 is anti-clockwise when looking down on the head of the stud which carries it. This, therefore, will be the direction of rotation of the sheave 53; and the sheaves 36 and 14 will turn in clock-wise and anti-clockwise directions, respectively, as viewed from the front of the machine, because of the direction in which the belt 66 travels over them from sheave 53. The forward drum 10 and the separator cone 30 will, of course, move in the direction of their attendant sheaves.

Broadly stated, the printing couple may be said to be composed of impression roll 75 and the die-hub 76. The roll 75 has a resilient cylindrical surface (preferably rubber) and is rigidly held on its shaft 77. A frame 78 with bearings 79 and 80 for the shaft 77 supports the roll 75 and the frame 78 is, in turn, supported by the arched flat spring 81. The spring 81 is connected to the frame 78 in a slot formed therein, screws 82 pressing the thin side of the slot 83 and the spring against the body of the frame. The screws 82 enter tapped holes in the body of the frame after having passed through body holes in the piece 83ª and the spring 81. The spring 81 is attached to the support 84 (connected in any suitable manner with the bed-plate 2) in a manner similar to its attachment to the frame 78. The spring 81 is extended beyond the frame 78 enough to permit its slotted end to straddle the adjusting screw 85. This screw 85 is threaded through a hole in the pillar 86 and held in any of its adjusted positions by the lock-nut 87, the enlarged end 88 of the screw acting against the spring to hold the roll in tight or loose contact with the die when the die-hub is in motion. The driving means for the impression-roll is provided by the sheave 89 attached to the lower end of the shaft 77 and an elongated spring 90 formed in the bed-plate 2 permits the movement of the frame 78 when the impression-roll 75 (because of the resiliency of the spring 81) yields to accommodate letters of varying thicknesses that pass between it and the die-hub 76.

The printing member or die-hub 76 is rigidly connected to its shaft 91 which has a bearing in the upper bed-plate 2 and enters the clutch 92. Just above the top of the clutch, the shaft 91 is provided with a collar 93 having forks 94 with the stop roll 95 carried between them and rotatably mounted on the stud 96. The collar 93 is rigidly connected to the shaft 91 and rests upon the thrust washer 97 which, in turn, rests upon the uppermost clutch ring 98.

The outer shell of the clutch 92 has a hub 99 formed at its bottom end and carries inside a spool composed of the tubular member 100 and the disks 101. The disks and the tubular member are integral and the tube extends below the lower disk the full length of the hub 99. The spool thus formed by the tube and disks is utilized to receive a suitable electrical winding 102, one end of which is grounded to the spool, as at 102$^a$, while the other end is brought out to the insulated collector ring 103, as at 102$^b$, which ring is held on the bottom of the clutch shell 92$^b$ by screws 104, appropriate insulation 105 intervening between the collector ring and the shell and the screws. The upper disk 101 is hermetically sealed to the interior walls of the shell, as shown at 101$^a$. The space above the spool is utilized to carry the clutch rings, the driver rings 98 alternating with the driven rings 106. Each driver ring is of the same diameter as the interior of the shell 92 and is provided with diametrically disposed lugs 107 that engage key-ways 108 cut in the shell. The driven rings 106 are of the same diameter as the driver rings and their eyes which are of the same diameter as the shaft 91, have key-ways 109 adapted to engage the diametrically disposed keys 110 fixed in the shaft 91. The eyes in the driver rings are large enough to prevent interference between themselves and the keys 110.

The clutch shell 92$^b$ at its hub 99 is connected by a set screw 92$^a$ with a shaft 111 that passes through a bearing 112 in the bed-plate 3 and connects with the main shaft which is described later. A thrust washer 113 intervenes between the hub 99 and the bearing 112 and sustains the weight of the clutch and all its parts.

An appropriate brush 114 (held in a brush-holder 115 that is supported by but insulated from the support 116 attached to the bed-plate 3) contacts with the collector ring 103 and serves to transmit current to the clutch winding 102. When energized, the winding 102 tends to draw the shaft 91 downward and the fixed collar 93 with its thrust washer 97 then operates to bring the driving and driven clutch rings 98 and 106 into close contact. (The driving and driven clutch rings are designed to be of different materials, the driving rings preferably steel and the driven rings preferably fiber.) The driving rings being connected to the clutch shell and the driven rings to the die-head shaft, it will be seen that the die-head shaft will revolve with the clutch shell because of the frictional contact between the two sets of rings and it will be seen further that the force with which the shaft 91 is drawn down into the tube 100 will determine the amount of this friction. The spool carrying the winding 102, being hermetically connected to the shell 92$^b$, renders that portion of the shell wherein the clutch rings are carried serviceable as a means in which to carry a lubricant for them without danger of the lubricant escaping to the winding with its consequent deleterious effects.

The clutch shell 92 has a groove 92$^c$ around its periphery at the end remote from the hub 99 and this groove is to receive the drive-belt 117.

Between the feed-rolls 41 and the printing couple are the tripping rollers 118 and 119, both of which are rigidly connected to their respective shafts 120 and 121, but electrically separated from the shafts by the insulating tubes 122 and 123. Roll 118 has its shaft 120 running in a bearing 120$^a$ fixed in the bed-plate 2 and a sheave 124 is suitably connected to the shaft at its lower end. The shaft 121 of roll 119 runs in a bearing 121$^a$ made in arm 125 and is provided with a sheave 126 which is rigidly connected to its lower end. The arm 125 is in pivotal engagement with a stud 127 screwed in the under side of bed-plate 2 and the arm is bifurcated where it engages the stud, the bifurcations alternating with similar bifurcations of the arm 128 which is also pivotally connected to the stud. The two arms are retained on the stud with the washer 129 by the nut 130.

A slot 131 concentric with the stud 127 is formed in the bed-plate 2 of sufficient size to permit that end of the arm 125 that carries the roll 119 to move therein. This slot provides the means for allowing the roll 119 to yield enough to permit letters of various thicknesses to pass between it and the roll 118.

Circumferential grooves 132 are formed in the rolls 118 and 119 and in these grooves the brushes 133 contact. The two brushes 133 and their holders 134 and 134$^a$ are identical in construction and the holder 134$^a$ is insulated from the bed-plate 2 whereon both are mounted by any appropriate method.

The printing member or die-hub 76 is designed for intermittent operation which necessitates means for starting and stopping it. The starting and moving means for the die-hub is provided by the clutch, while the stopping and releasing means therefor is contained in the bell-crank lever 135 and the magnet armature 136 which are connected together by a series of links. The magnetic poles 137 and 138 which are integral with and emanate from the pole-pieces 139 and 140 of the generator, are utilized for operating the armature 136. This armature is pivotally connected (between extending ears 141 on the pole 137) to a pin 142 which passses through the eyes and through a hole in the projection 143 provided at the end of the armature.

The pole 138 has an integral horn 144 to assist in attracting the armature to it from the most remote position of the armature.

The projection 143 is extended beyond the point where it engages the pin 142 and is bifurcated at this extended end, so that the eye of the link 145 may connect between the bifurcations with the pin 146. Link 145 connects similarly with a link 147 which, in turn, connects to one arm of the bell-crank lever 135 by the link 148. The bell-crank lever 135 is designed for pivotal movement on the stud 149 fixed in the plate 150. To one side of the longitudinal center of link 147, the link 151 is pivoted and this last link is also in pivotal engagement with the stud 152 fixed in the plate 150. Stop pins 153 and 154 are attached to plate 150 to provide stops respectively for the link 151 and bell-crank lever 135. A spring 155 attached between one arm of the bell-crank lever 135 and a point on plate 150 serves to keep the said bell-crank lever normally against its stop 154. Between the end of 143 and a hook 156 connected to the pole 137 a spring 157 is provided to draw the armature 136 away from the pole 138 when not attracted thereto.

On the under side of bed-plate 2, a boss 158 is formed with countersunk holes adapted to receive the annular bosses 159 of the plate 150 and flat-head screws 160 protrude from the top of bed-plate 2 through the boss 158 and thread into the bosses 159.

The several links, the bell-crank lever 135 and the armature 136 just described comprise the means for liberating the die-head and for arresting it after it has made one revolution.

When the means for energizing the magnetic poles 137 and 138 is operated, these poles exert an attractive force on the armature 136 which (moving against the tension of the spring 157) rocks the link 147 at its pivoted connection with the link 151 through the instrumentality of the connecting link 145. This rocking motion is transmitted to the bell-crank lever 135 by the link 148 whereupon the bell-crank lever 135 turns on its stud 149 enough to permit its long end to disengage the stop roll 92 (it being understood that the normal position of lever 135 brings it in engagement with roll 92). After this first operation the clutch, by means of the mechanism previously described, puts the die-head in motion.

As the armature 136 is designed to be held by the poles 137 and 138 for a longer period of time than is necessary for the die-head to make one revolution, means is required to return the lever 135 to its normal position in order to stop the die-hub at the conclusion of one revolution. With the present device this is accomplished automatically. At the beginning of the operation the pivotal connection between the links 147 and 151 is a fixed point, but, as the longer end of link 147 moves in the direction toward lever 135, the angle between it and the link 148 becomes more obtuse until finally a point is reached where a lateral pressure is exerted on this pivotal connection between the links. At the inception of this lateral pressure the link 151 starts to move on its pivot 152 away from its stop pin 153 and this movement of 151 continues until the spring 155 has drawn the lever 135 back against its stop 154 when the lever 135 is in a position to engage roll so as to stop the die hub. After the removal of the magnetizing force, the armature 136 is enabled by means of its spring 157 to resume its former position, the link 151 returning to its position against the stop 153. The link 147, where it connects with the link 145, has its eye elongated, so that the link 151 may swing away from its stop 153 without binding the other links or interfering with their individual movements. A spring 240 attached between link 151 and a point on plate 150 keeps the link 151 normally against its stop 153. Figs. 11, 12 and 13 show the several positions assumed by lever 135 and its attendant links.

The cycle of operations just described is performed for each piece of mail that passes through the machine, its passage between the rolls 118 and 119 serving to upset an electrical balance that results in these several operations.

The electrical energy necessary for the operation of the clutch and for effecting the operation of the lever 135 and its attendant links is derived from a generator of the conventional series type having the pole-pieces 139 and 140, the field-coil 161, the armature 162, the grounded brush 163 and the insulated brush 164. The pole-pieces 139 and 140 are mounted on blocks 165 (of some non-magnetizable material) through which they are bolted to the lower bed-plate 3 in a depression formed therein. The armature 162 has a suitable lower bearing in bed-plate 3 and an upper bearing in the yoke 166 wherein the brushes 163 and 164 are carried.

One end of the field coil 161 is connected to a binding post 167 insulated from bed-plate 3 and a metallic rod 168 connects this binding post with the brush-holder 115. The other end of the field-coil is brought to an insulated binding post 169 on pole 138 and a metallic rod 170 passes from it through the insulating bushings 171 in the poles 137 and 138 and attaches to the stud of the brush-holder 134ª. A metallic strip 172 connects the binding post 169 with the insulated generator brush 164. At a selected point in the field-coil 161, a tap is made, the connection 173ª from which is brought to the insulated binding post 173 and continued to the other brush holder 134 by the metallic rod 174 that is insulated where it passes through the poles 137 and 138 by the insulating tubes 175.

Fig. 15 illustrates diagrammatically the arrangement just described and for an understanding of the principles involved reference is best had to it. A rheostat is shown in this diagrammatic figure, but does not appear in the other figures. Its use is not essential to the successful operation of the electrical equipment, but it adds an advantage by providing a quick and ready adjustment for the clutch. The rheostat enables an operator of the machine to quickly and by hand regulate the intensity of the force by which the clutch drives the die-hub. Therefore, the die-hub can be made to lag in speed behind the speed of the mail advancing rolls whereby its operation may be regulated to properly position the cancellation and postmark on thick mail matter which does not when passing through the machine ordinarily acquire the speed of the advancing rolls, as mentioned hereinbefore.

The rolls 118 and 119 are designed to be made of metal and when they are running in contact with each other they short-circuit all of that part of the field coil 161 contained between the tap connected to rod 174 and the lead connecting with rod 170. The small portion of the field coil left active is used as a means to allow the generator to build up quickly when the short-circuit is removed. With the rolls 118 and 119 in contact and the armature 162 turning, the active circuit includes, in the order named, the insulated brush 164, the strip 172, the rod 170, the brush 133, the roll 118, the roll 119, the second brush 133, the rod 174, the small active portion *a* of the field coil 161, the rod 168, the rheostat 176, the rest of rod 168ª, the brush 114, the collector ring 103, the clutch winding 102, the ground and the grounded brush 163. The ground named in this diagrammatic figure corresponds to a metallic connection made with the body of the machine. When the rolls 118 and 119 are electrically separated by a non-metallic substance, such as a piece of mail, the short circuit which had obtained between the rods 170 and 174 is removed and the whole of the field coil 161 then becomes active giving a strong magnetization to the clutch winding 102 and strengthening the poles 137 and 138 magnetically, so that they may be enabled to attract the armature 136 with sufficient force to effect the operation of the lever 135 with its consequent liberation of the die-hub.

When the armature 136 has come in contact with the pole 139, it has the effect of damping the magnetic effort of the pole-pieces 139 and 140 by diverting a portion of their magnetism through itself and through the poles 137 and 138. This results in a reduction of the energy delivered to the clutch and is beneficial inasmuch as, the clutch having started the die-hub at full power, the same amount of energy is not necessary to keep the said die-hub in motion. The reduction in the strength of the clutch after having started the die-hub operates to reduce the force of the shock when the die-hub is stopped.

The regulating resistance shown in the diagram may be used to regulate the clutch to suit the conditions of the service it is called upon to perform.

When a letter or other piece of mail is passing through the machine, its entrance between the rolls 118 and 119 removes the short-circuit previously referred to and this short-circuit is not reëstablished until the letter has left the rolls. Were not some means provided for stopping the die-hub after it makes one revolution, it would continue to revolve until the rolls 118 and 119 had resumed contact after having been separated and the result would be that the die and canceler would register more than once on the passing piece of mail. The lever 135 and its essential links provide the stopping means for the die-hub. The starting means provides; first, for the removal of the short-circuit, that enables the generator to exert its full power in energizing the clutch winding 102 and causing it to exercise its greatest pull on the shaft 91 with the consequent increase of frictional contact between the rings 98 and 106; second, for a reduction in the strength of the generator resulting in a reduction of the frictional contact between ring 98 and 106; and third, for a reduction of the strength of the generator to a minimum on the reëstablishment of the short-circuit. The first provision is advantageous in that it gives excess energy for overcoming the inertia of the die-hub at starting; the second, in that it reduces the energy to a point where the draft on the generator is only the amount necessary to keep the die-hub in motion; and the third, in that it reduces the wear on the clutch rings by practically nullifying the generating power of the generator and with it the pull on the shaft 91.

A consideration of their principles will show that the friction of the clutch rings 98 and 106 with its relative variations will be maintained constant under all conditions of wear of said clutch rings. In other words, the clutch will automatically compensate for the wear on its clutch rings until the shaft 91 and the die-hub 76 connected thereto are brought down too low to render satisfactory service.

The ink-roll 177 (made preferably of felt and mounted on a suitable bushing) revolves (by frictional contact with the die-hub 76) on a stud 178ª fixed in the plate 178. The plate 178 is held on the bed-plate 2 by the thumb-screw and washer 179 which passes through an elongated hole 179ª in 178. Ink is transferred to roll 177 by a roll 180 which receives it from a tank 181 attached to the lower bed-plate 3. A splash guard 182 is provided to prevent the roll 180 from throwing ink over the various parts of the machine. The roll 180 and tank 181 form no part of the present application and their construction, therefore, will not be described. Suffice it to say that they constitute the means for supplying ink to the roll 177 from which it is transferred to the printing means on die-hub 76.

The structure of this inking apparatus will form the subject-matter of an application to be later placed on file. Since this device is at present in an experimental stage, it is important that the principle invoked be not made known at the present time.

The packer tray or portion of the machine whereon canceled letters and cards are stacked has a bottom formed of rods 183 which, where they join the bed-plate 2 are held frictionally in holes on the front edge thereof. Brace-rods 184 similarly held but emanating from the lower bed-plate 3 aid in resisting the weight imposed on the packer tray by stacks of canceled mail. Both the rolls 183 and rod 184 attach by screws to the plate 185 and a guide piece 186 also attaches at one end to this plate. The other end of guide piece 186 connects with small brackets 187 attached to bed-plate 2 by appropriate screws. The packer slide 239 is carried slidably connected to the outermost rod 183.

The packer star-wheel 188 is connected in any conventional manner with its shaft 189 which has bearing in the upper bed-plate 2 and in the packer fence 190 and carries on its end below the bed-plate 2 a sheave 191.

The packer fence 190 is held on the bed-plate 2 by screws 192 which pass through eyes in its feet 193.

The packer extension arm 194 has a slide bearing in the column 195 which is attached to bed-plate 2 and its rack teeth mesh with the teeth of a small gear 196 that is carried on a shaft 197 having a bearing in the column and a bearing in the cover plate 198 The shaft 197 is shouldered below the cover plate 198 and extends up through the spiral spring 199 and connects with a handle 200. The cover plate 198 is attached to the column 195 by screws and it serves to hold both the gear 196 and the extension arm 194 in position. The spring 199 is compressed between the handle 200 and a boss 201 on the cover plate. This spring operates to hold the shoulder of the shaft 197 against the under side of the cover plate and the frictional contact thus produced is sufficient to keep the handle 200 and the gear 196 and arm 194 in any of their adjusted positions. The stacker extension arm is designed for use with various lengths of letters. It can be adjusted longitudinally to any desired position by simply turning the handle 200 to either the right or left depending on whether the arm is to be moved in or out.

The packer feed rolls 202 and 203 are identical in shape and mounting to the trip rolls 118 and 119 with the exception of being insulated. Roll 202 is like roll 119 having a shaft 204, a sheave 205 and an arm 128 wherein shaft 204 has a bearing. A slot 206 concentric with the stud 127 allows the arm 128 to move back to accommodate different thicknesses of letters that pass between rolls 202 and 203. Roll 203 is like roll 118, its shaft 207 having a bearing in bed plate 2 and carrying a sheave 208 at its lower end.

As a means for moving the various rotating parts which have just been described, the belt 117 is used. Two idle sheaves are necessary to properly direct this belt over the several sheaves it is called upon to turn. These two idle sheaves are 209 and 210. They are supported respectively by the colums 211 and 212 attached to the lower bed-plate 3 and to the pole 139 respectively and revolve on their respective screw studs 213 and 214.

A sheave 215 attached to its shaft is the means for rotating the armature 162 of the generator.

Beginning at the clutch shell 92, the belt 117 runs first around the impression roll sheave 89, then in reverse directions around the sheaves 124 and 126 of the rolls 118 and 119, then around the sheave 52, then around the sheaves 44, 209, 215, 210, 208, 191, and 205 in the order named, and returns to the clutch shell 92.

Between the sheaves 205 and 191, an idle sheave 216 runs. This sheave rotates on a stud held by the arm 217 that is integral with a hub 218 from which an arm 219 emanates substantially at right angles to the arm 217. The hub 218 is pivotally mounted on the stud 220 held by the bed-plate 2 and a spiral spring 221 connected between one end of the arm 219 and a point on bed-plate 2 operates to press the sheave against the belt 117 and draw it tightly around the various sheaves over which it runs. The sheave 216 and its attendant parts also operate to keep the rolls 119 and 202 normally in contact with rolls 118 and 203 respectively and provides the resilient means by which rolls 119 and 202 are enabled to yield to various thicknesses of letters.

The machine may be operated by any means that provides for supplying motion to the shaft 111. In this instance a variable speed drive is used and is advantageous in that it permits the machine to be run at different speeds with the speed of the driving motor constant. A shaft 222, coupled to shaft 111 at its bottom, is journaled at its bottom in a bearing 223 bolted to the column 1. The bearing 223 has a thrust screw 224 for supporting the shaft at its end. A friction wheel 224ª is carried by shaft 222 and is capable of vertical adjustment on the shaft. A feather 225 secures it against rotary movement on the shaft and a set-screw 226 holds it in any of its adjusted positions. Co-acting with the friction wheel 224ª is a disk 227 carried by a shaft 229 to which it is slidably connected. The shaft 229 has a bearing 230 bolted to column 1 and outside of this bearing the main drive sheave 231 is connected to the shaft. In conjunction with the pulley sheave 231, the solid collar 232 secures the shaft 229 against longitudinal movement in its bearing, a suitable ball-bearing thrust 237 intervening between the collar and bearing.

The slidable connection between the disk 227 and shaft 229 comprises a pin 233 fixed rigidly in the hub of the disk and engaging an elongated hole 234 diametrically through the shaft 229. Against this pin 233 a pin 235 presses, the compression spring 236 which bears against pin 235 operating to move the disk 227 toward its farthest point on shaft 229 and, therefore, to keep it always in firm contact with friction wheel 224ª. The shaft 229 has a longitudinal hole through its center wherein the spring 236 and pin 235 are contained. This longitudinal hole is tapped at the pulley end of the shaft and a screw 237ª is inserted for adjusting the pressure of spring 236. A set screw 238 is provided for holding screw 237ª in any of its adjusted positions and also for holding sheave 231 on the shaft 229, this screw threading through a tapped hole in the hub of sheave 231 and through a body hole in shaft 229, thus being permitted to bear upon the side of screw 237ª.

It will be seen that the speed of the machine can be varied by adjusting the friction wheel 224 up and down the shaft 222 and the resilient connection of the disk 227 with its shaft 229 will serve to always keep the disk in firm contact with the friction wheel.

When power is supplied to the sheave 231, the machine will be put in motion. As each letter (separated from a stack placed on the feed-belt 9) is carried through the machine, the several operations previously described will be effected and the letters will be transferred canceled to the packer tray where they will be stacked in orderly fashion against the packer slide 239.

The invention having been described, what is claimed as new and useful is:—

1. In a mail marking machine, a die-hub, means for effecting the intermittent movement thereof, and mechanisms conjoined with said means for varying the interval of time necessary to overcome the inertia of the die-hub when putting the same in motion.

2. In a canceling machine, a die-hub, electrical means for effecting the intermittent movement thereof, and further electrical means conjoined with said former means for varying the interval of time necessary to overcome the inertia of the die-hub when putting the same in motion.

3. In a mail marking machine, an intermittent die-hub, driving means therefor, and means for the automatically instantaneous variation of the intensity of the driving means.

4. In a canceling machine, an intermittent die-hub, driving means therefor, and means for varying the intensity of the driving means during the cancellation of mail.

5. In a mail marking machine, an intermittent die-hub, a frictional driving means therefor, and automatic means for varying the friction of said driving means when the latter is in motion.

6. In a canceling machine, an intermittent die-hub, an electro-frictional driving means therefor, and automatic means remote from said driving means for varying the frictional intensity of the latter.

7. In a mail marking machine, an intermittent die-hub, a two-part driving device therefor comprising driving and driven members, the driving member being constantly rotated, the driven member having fixed connection with the die-hub, and automatic means connected with the driving member but remote therefrom for varying the interval of time necessary to overcome the inertia of the die-hub when putting the same in motion.

8. In a canceling machine, an intermittent die-hub, a two-part driving device therefor comprising a constantly rotating magnetized driving member and a driven member moved by the attractive force thereof, the driven member having fixed connection with the die-hub, and manual means for varying the attractive force of the driving member.

9. In a mail marking machine, an intermittent die-hub, a two-part driving device therefor comprising a constantly rotating magnetized driving member and a driven member moved by the attractive force thereof, the driven member having fixed connection with the die-hub, and manual means for varying the attractive force of the driving member while the same is in motion.

10. In a canceling machine, an intermittent die-hub, a two-part driving device therefor comprising a constantly rotating magnetized driving member and a driven member moved by the attractive force thereof, the driven member having fixed connection with the die-hub, and automatic means for varying the interval of time necessary to overcome the inertia of the die-hub when putting the same in motion.

11. In a mail marking machine, an intermittent die-hub, an electro-frictional two-part driver therefor, and automatic means for varying the interval of time necessary to overcome the inertia of the die-hub when putting the same in motion.

12. In a canceling machine, an intermittent die-hub, an electro-frictional two-part driver therefor, and automatic means for varying the intensity of the friction between the two parts of said driver.

13. In a mail marking machine, an intermittent die-hub, an electro-frictional two-part driver therefor, and automatic means connected with the driver but remote therefrom for varying the intensity of the friction between the two parts of said driver.

14. In a canceling machine, an intermittent die-hub, an electro-frictional two-part driver therefor, and automatic means for the instantaneous adjustment of the frictional relation between the two parts of said driver.

15. In a mail marking machine, an intermittent die-hub, an electro-frictional two-part driving device therefor comprising an electrified driving and a frictional driven member, the driven member having connection with the die-hub, and electrical means conjoined with the driving member for automatically varying the intensity of the force imparted by it to the driven member.

16. In a canceling machine, a die-hub, driving means therefor, means for intermittently arresting the movement thereof, and means conjoined with the driving means whereby the intensity of the latter is reduced during the periods the die-hub remains arrested.

17. In a mail marking machine, a die-hub, driving means therefor, means for intermittently arresting and releasing the die-hub, and means conjoined with the driving means for varying the intensity of said means, whereby the intensity is reduced during the periods the die-hub remains arrested.

18. In a canceling machine, a die-hub, driving means therefor, means for intermittently arresting and releasing the die-hub, and electro-mechanical mechanism coöperatively connected with the driving means, whereby the intensity of the latter is reduced while the die-hub remains arrested but increased when the die-hub is released.

19. In a mail marking machine, a die-hub, electro-frictional driving means therefor, means for intermittently arresting and releasing the die-hub, and electro-mechanical mechanism coöperatively connected with the driving means, whereby the intensity of the latter is reduced while the die-hub remains arrested but is increased when the die-hub is released.

20. In a canceling machine, a die-hub, driving means therefor, means for intermittently arresting and releasing the die-hub, and means common to said latter means and to the driving means whereby the one is rendered operative and the other reduced in intensity when the die-hub is arrested.

21. In a canceling machine, a die-hub, driving means therefor, means for intermittently arresting the movement thereof, and means conjoined with the driving means for automatically reducing the intensity of the driving means during the periods the die-hub remains arrested.

22. In a mail marking machine, a die-hub, driving means therefor, means for arresting the movement thereof, letter-actuated means conjoined with said latter means whereby the die-hub is released, and means coöperatively connected with the driving means and included in the letter-actuated means whereby the intensity of the driving means is increased with the release of the die-hub.

23. In a canceling machine, a die-hub, electro-frictional driving means therefor, and a letter-controlled electro-mechanical mechanism coöperatively connected with the driving means for intermittently arresting the movement of the die-hub and reducing the intensity of the driving means.

24. In a mail marking machine, a die-hub, driving means therefor, and a letter-controlled mechanism conjoined with the driving means, whereby the die-hub is intermittently released and arrested with a reduction in the intensity of the driving means during the periods the die-hub remains arrested.

25. In a canceling machine, a die-hub, a two-part driver therefor comprising a driving section and a driven section, means for constantly moving the driving section, means for intermittently arresting and releasing the driven section, the die-hub being secured to the driven section, and letter-controlled means common to both the two-part driver and the releasing and arresting means, whereby the intensity of the force imparted by the driving section to the driven section is automatically increased simultaneously with the release of the driven section.

26. In a mail marking machine, a printing couple, mail advancing couples, means conjoined with one unit of each couple whereby the unit is rendered laterally movable with respect to the other unit, an endless belt interconnecting the several couples and the individual units thereof, and a resilient tightener for the belt, whereby the laterally movable units are rendered yieldable against the resiliency of the said tightener.

27. In a mail marking machine, the combination with a bed-plate, of a printing couple and mail advancing couples mounted thereon, each couple having one of its units journaled in the bed-plate, a laterally movable bearing for the other unit of each couple, a sheave for each unit of each couple, an endless belt interconnecting all of the sheaves, an arm pivotally mounted on the bed-plate, an idle sheave carried at the free end of the arm, and a spring tensioned between the arm and the bed-plate and causing the idle sheave to bear upon the belt.

28. In a mail marking machine, the combination of a printing couple comprising a die-hub and an impression roll, of a resilient bearing support for the impression roll, a two-part driver consisting of a driving section and a driven section to which latter the die-hub is connected, a bell-crank lever normally obstructing the movement of the driven section, a series of links connected with the bell-crank lever, a swinging arm having pivotal engagement at its end with the intermediate link of said series, and letter-actuated mechanism conjoined with said series of links whereby the bell-crank lever may be moved from its obstructing position and returned in time to permit only one revolution of the die-hub for each operation of said letter-actuated mechanism.

29. In a mail marking machine, the combination of a printing couple comprising a die-hub and an impression roll, of a resilient bearing support for the impression roll, a two-part driver consisting of a driving section and a driven section to which latter the die-hub is connected, an abutment member carried by the driven section, a pivotally mounted bell-crank lever having one end normally engaging said abutment member, a letter-actuated mechanism, a pivotally mounted member operatively connected with said mechanism, a series of links connecting the pivotally mounted member and the bell-crank lever, a swinging arm having its free end in engagement with one of the links of said series, and springs against whose tension the bell-crank lever, the swinging arm and the pivotally mounted member move.

30. A releasing and arresting device comprising a supporting member, a bell-crank lever pivoted thereon, a stop for said lever, an arm swingingly mounted on the supporting member, a stop for said arm, a link carried pivotally at the free end of said arm, said pivotal connection being effected between the ends of said link, a second link having its ends pivotally connected with one end of the first link and one end of the bell-crank lever, a third link having pivotal connection with the other end of said first link, this third link having means for connection to a device for imparting rocking movement to the first link, and springs for drawing the bell-crank lever and swinging arm against their stops.

31. A releasing and arresting device comprising a supporting member, a bell-crank lever pivoted thereon, a stop for said lever, an arm swingingly mounted on the supporting member, a stop for said arm, a link carried pivotally at the free end of said arm, said pivotal connection being effected to one side of the longitudinal center of the link and the arm being angularly disposed with reference to the link, a second link having its ends pivotally connected with one end of the first link and one end of the bell-crank lever, a third link having pivotal connection with the other end of said first link, said third link having means for connection to a device for imparting rocking movement to the first link, and springs for drawing the bell-crank lever and swinging arm against their stops.

32. In a mail marking machine, the combination with a printing couple comprising a die-hub and an impression roll, of an electro-frictional driver for the die-hub, a normally inert electrical supply device for the driver, a pair of mail advancing rolls for the printing couple, connections between the supply device and the advancing rolls, and a releasing and arresting device for the die-hub, said releasing and arresting device being conjoined with the electrical supply device, whereby the passing of a letter between the advancing rolls operates to revivify the electrical supply device.

33. In a mail marking machine, the combination with a printing couple comprising a die-hub and an impression roll, of an electro-frictional driver for the die-hub, an electric generator connected electrically with the driver, the generator having a magnetizing coil, a releasing and arresting device connected magnetically with the generator and mechanically with the die-hub, and a letter-released short-circuit for the major portion of the magnetizing coil.

34. In a mail marking machine, the combination with a printing couple comprising a die-hub and an impression roll, of an electro-frictional driver for the die-hub, an electric generator connected electrically with the driver, the generator having a magnetizing coil, a releasing and arresting device connected magnetically with the generator and mechanically with the die-hub, a pair of insulated mail advancing rolls normally in electrical contact, and connections between the magnetizing coil and the rolls whereby the major portion of the coil is short-circuited when and only when the rolls are in contact.

35. In a mail marking machine, the combination with a printing couple comprising a die-hub and an impression roll, of an electro-frictional two-part driver for the die-hub consisting of an electrified driving section and a frictional driven section to which latter the die-hub is connected, an electric generator connected electrically with the driving section, the generator having a magnetizing coil, a releasing and arresting device connected magnetically with the magnetizing coil and mechanically with the said driven section, a pair of insulated mail advancing rolls, normally in electrical contact, a laterally movable bearing support for one of said rolls, and short circuiting medium for the major portion of the magnetizing coil which medium includes the mail advancing rolls in circuit with it.

36. In a canceling machine, an intermittent die hub, an electro-frictional two-part driver therefor, and manual means for varying the intensity of the friction between the two parts of said driver.

37. In a canceling machine, an intermittent die hub, an electro-frictional two-part driver therefor, and manual means for instantaneous adjustment of the frictional relation between the two parts of said driver.

38. In a canceling machine, an intermittent die-hub, driving means therefor, means for the automatic instantaneous variation of the intensity of the driving means, and manual means for varying the intensity of the said driving means.

39. In a canceling machine, an intermittent die-hub, driving means therefor, and article-controlled means governing the intermittent operation of the die-hub and automatically varying the intensity of the driving means.

40. In a canceling machine, an intermittent die-hub, driving means therefor, and means for the instantaneous regulation of the driving means, whereby the die-hub may be made to lag in speed behind the driving means.

41. In a canceling machine, an intermittent die-hub, driving means therefor, article-controlled means which both governs the intermittent operation of the die-hub and varies the intensity of the driving means, and means connected with the driving means for instantaneously regulating the same to effect any desired lag in speed of the die-hub behind the driving means.

42. In a canceling machine, an intermittent printing member, an electro-frictional driver therefor, an energizing medium for the driver, and manual means for regulating the effect of said medium upon the driver.

43. In a canceling machine, an intermittent printing member, an electro-frictional driver therefor, an energizing medium for the driver, and article advancing means connected with the said medium, whereby the intensity of the same is automatically varied.

44. In a canceling machine, an intermittent printing member, an electro-frictional driver therefor, an energizing medium for the driver, and means for instantaneously regulating the said medium, whereby its effect upon the driver is maintained uniformly at an increased or reduced intensity.

45. In a canceling machine, an intermittent printing member, a driver therefor, article-controlled mechanism governing both the printing member and the driver, and means for the separate instantaneous control of the driver.

46. In a canceling machine, an intermittent die-hub, a two-part frictional driver therefor comprising a driving and a driven section, means for arresting and releasing the driven section, and article-controlled means which increases and reduces the intensity of the driving section during the periods of movement and rest respectively of the driven section.

47. In a canceling machine, a die-hub, a driver therefor, comprising driving and driven sections, and article-controlled means, whereby the driven section is arrested and released and the driving section reduced and increased in the intensity of its driving force.

48. In a canceling machine, a die-hub, an electro-frictional driver therefor having driving and driven sections, a releasing and arresting device for the driven section, and an article-controlled energizing medium for the driving section, whereby the driving force of the latter is increased or reduced accordingly as the driven section is released or arrested.

49. In a canceling machine, a die-hub, an electro-frictional driver therefor having driving and driven sections, means for constantly moving the driving section, means for intermittently arresting the driven section, frictional means interposed between the two said sections, and article-controlled electrical energizing means for the driving section, whereby the intensity of the latter's driving force is reduced during the periods of rest of the driven section.

50. A releasing and arresting device comprising an oscillatory stop member capable of releasing and arresting oscillations, an oscillatory actuating member therefor, and connections between the two members, whereby both oscillations of the former are accomplished on the actuating oscillation solely of the latter leaving inactive the return oscillation of the said latter.

51. A releasing and arresting device having an oscillatory stop lever movable into releasing or arresting position, an oscillatory actuating lever therefor, and link connections between the two levers, whereby both oscillations of the former are accomplished by and only by the actuating oscillation of the latter.

52. In a canceling machine, an intermittent printing member, a frictional two-part driver therefor, an article-controlled means for varying the intensity of the friction between the two parts of said driver.

53. In a canceling machine, an intermittent printing member, a frictional two-part driver therefor, and article-controlled means connected with the driver but remote therefrom for varying the intensity of the friction between the two parts of said driver.

54. In a canceling machine, an intermittent printing member, a frictional two-part driver therefor, a pair of article forwarding rolls, and means connecting the rolls with the driver, whereby the passing of an article between the rolls serves to instantaneously intensify to a predetermined degree the intensity of the frictional contact between the two parts of said driver.

55. In a canceling machine, a die-hub, a frictional two-part driver therefor, a pair of article forwarding rolls, a die-hub releasing and arresting device, and means operatively connecting the rolls with the driver and with the said device, whereby the die-hub is released and arrested and the frictional engagement between the two parts of the driver accordingly instantaneously increased to a predetermined degree and instantaneously reduced to predetermined degree.

In witness whereof, in the presence of two witnesses, the inventor's signature is hereunto affixed.

FRANCIS G. BOSWELL

Witnesses:
 FRANKLIN H. HOUGH,
 A. L. HOUGH.

Copies of this patent may be obtained for five cents each, by addressing the "Commissioner of Patents, Washington, D. C."